(12) United States Patent
Dix et al.

(10) Patent No.: US 11,610,295 B2
(45) Date of Patent: Mar. 21, 2023

(54) SYSTEM AND METHOD FOR DETECTING THE OPERATING CONDITION OF COMPONENTS OF AN IMPLEMENT

(71) Applicant: CNH Industrial America LLC, New Holland, PA (US)

(72) Inventors: Phillip Duane Dix, Westmont, IL (US); Daniel Geiyer, Bolingbrook, IL (US); Aditya Singh, Bolingbrook, IL (US); Brett McClelland, Chicago, IL (US); Navneet Gulati, Naperville, IL (US)

(73) Assignee: CNH Industrial America LLC, New Holland, PA (US)

(*) Notice: Subject to any disclaimer, the term of this patent is extended or adjusted under 35 U.S.C. 154(b) by 203 days.

(21) Appl. No.: 16/707,479

(22) Filed: Dec. 9, 2019

(65) Prior Publication Data

US 2021/0174488 A1 Jun. 10, 2021

(51) Int. Cl.
*G06T 7/00* (2017.01)
*G10L 25/51* (2013.01)
*H04N 5/232* (2006.01)

(52) U.S. Cl.
CPC ............ *G06T 7/0004* (2013.01); *G10L 25/51* (2013.01); *H04N 5/23299* (2018.08); *G06T 2207/30164* (2013.01)

(58) Field of Classification Search
CPC ......... G06T 7/0004; G06T 2207/30164; G10L 25/51; H04N 5/23299; G01N 21/88; G05B 19/4065
See application file for complete search history.

(56) References Cited

U.S. PATENT DOCUMENTS

| | | | | |
|---|---|---|---|---|
| 4,943,798 A | * | 7/1990 | Wayne | G10K 11/004 340/446 |
| 5,150,618 A | * | 9/1992 | Bambara | B61K 9/04 73/660 |
| 5,436,612 A | * | 7/1995 | Aduddell | B60Q 1/52 340/446 |
| 5,907,100 A | * | 5/1999 | Cook | G01N 29/50 73/602 |
| 6,507,790 B1 | | 1/2003 | Radomski | |

(Continued)

FOREIGN PATENT DOCUMENTS

BR 201000696 A2 1/2012
WO WO 2011138488 A1 11/2011

*Primary Examiner* — Aaron W Carter
(74) *Attorney, Agent, or Firm* — Rickard DeMille; Rebecca Henkel

(57) ABSTRACT

A system for detecting the operating condition of components of an implement may include an implement, a first sensor comprising one of an acoustic sensor or a vision-based sensor, a second sensor comprising the other of the acoustic sensor or the vision-based sensor, and a controller communicatively coupled to the first and second sensors. The controller may receive performance data from the first sensor indicative of a performance of the implement. The controller may further monitor the performance data received from the first sensor and identify an area of interest relative to the implement. Additionally, the controller may control an operation of the second sensor to collect component data indicative of an operating condition of at least one component of the implement located within the area of interest.

21 Claims, 3 Drawing Sheets

(56) References Cited

U.S. PATENT DOCUMENTS

| | | |
|---|---|---|
| 6,778,894 B2 | 8/2004 | Beck et al. |
| 7,654,141 B2 | 2/2010 | Behnke et al. |
| 7,973,654 B2 | 7/2011 | Ehrhart et al. |
| 2003/0136192 A1* | 7/2003 | Tu .................... G01N 29/12 73/587 |
| 2006/0180760 A1* | 8/2006 | Lane ..................... G01J 5/026 250/339.05 |
| 2006/0197666 A1* | 9/2006 | Babich ............. G08B 13/19697 340/544 |
| 2006/0244588 A1* | 11/2006 | Hannah ............... G01C 21/206 340/539.13 |
| 2006/0253282 A1 | 11/2006 | Schmidt et al. |
| 2009/0177354 A1* | 7/2009 | Agrawal ............. G01M 17/007 701/33.4 |
| 2009/0282922 A1* | 11/2009 | Gerstenberg ......... G01N 29/265 73/606 |
| 2011/0197679 A1* | 8/2011 | Kono .................... G01N 29/28 73/632 |
| 2014/0160445 A1* | 6/2014 | Oi ....................... H04N 9/3129 353/85 |
| 2014/0167960 A1* | 6/2014 | Argue .................. B07C 5/3422 340/540 |
| 2014/0177907 A1* | 6/2014 | Argue ..................... G06K 9/00 382/103 |
| 2014/0177924 A1* | 6/2014 | Argue ................ G06K 9/00771 382/104 |
| 2016/0152416 A1* | 6/2016 | Staab .................... B65G 23/00 73/865.8 |
| 2017/0328029 A1* | 11/2017 | Tsuji ....................... E02F 5/32 |
| 2018/0128783 A1 | 5/2018 | Bittner et al. |
| 2018/0315260 A1 | 11/2018 | Anthony |
| 2018/0350167 A1 | 12/2018 | Ekkizogloy et al. |
| 2019/0121350 A1* | 4/2019 | Cella ................ G05B 19/41875 |
| 2019/0258271 A1* | 8/2019 | Sporrer ................ G05D 1/0238 |
| 2019/0379847 A1* | 12/2019 | Ferrari ................ H04N 5/3675 |
| 2020/0113118 A1* | 4/2020 | Stanhope ............. A01B 79/005 |
| 2020/0114843 A1* | 4/2020 | Foster .................. A01D 41/127 |
| 2020/0158656 A1* | 5/2020 | Chung ................. B61L 27/0094 |
| 2020/0226851 A1* | 7/2020 | Harmon ............... G07C 5/0816 |
| 2020/0357204 A1* | 11/2020 | Crequer .................. G06T 7/70 |
| 2021/0027449 A1* | 1/2021 | Ferrari ................ A01B 49/027 |
| 2021/0048290 A1* | 2/2021 | Henry .................. A01B 29/046 |
| 2021/0088780 A1* | 3/2021 | Henry ....................... B06B 3/00 |
| 2021/0089027 A1* | 3/2021 | Dasika ................ A01B 79/005 |
| 2021/0127540 A1* | 5/2021 | Smith .................... A01B 61/00 |
| 2021/0127546 A1* | 5/2021 | Smith .................... A01B 47/00 |
| 2021/0134081 A1* | 5/2021 | Claussen ................. B61L 1/10 |
| 2021/0174488 A1* | 6/2021 | Dix ..................... H04N 5/23299 |
| 2021/0272387 A1* | 9/2021 | Heard .................... G07C 5/008 |
| 2021/0347293 A1* | 11/2021 | Zeng ...................... B60Q 1/44 |
| 2022/0192076 A1* | 6/2022 | Sharma ................. G06N 20/00 |
| 2022/0198642 A1* | 6/2022 | Sharma ................. G06T 7/0004 |
| 2022/0198643 A1* | 6/2022 | Sharma ................. H04N 13/204 |

\* cited by examiner

SYSTEM AND METHOD FOR DETECTING THE OPERATING CONDITION OF COMPONENTS OF AN IMPLEMENT

FIELD OF THE INVENTION

The present disclosure relates generally to agricultural implements and, more particularly, to systems and methods for detecting the operating condition of components of an implement based on acoustic and visual data.

BACKGROUND OF THE INVENTION

Various components of an agricultural implement may become impaired during the performance of an agricultural operation. For example, the components of the implement, such as ground engaging tools, bearings, actuators, and/or the like, may have an impaired operating condition in which the components are worn out, broken, fractured, or plugged with field materials. When components of the implement are impaired, the sound or noise emitted by the operation of such components may change. For example, the intensity of the sound emitted by the operation of a worn bearing is generally much greater than the intensity of the sound emitted by a non-worn bearing. Similarly, the sound emitted by the operation of a plugged bearing is generally has a lower or damped intensity in comparison to the sound emitted by a non-plugged bearing.

Typically, an operator is relied upon to occasionally check the operating condition of components of the implement and monitor the sounds generated by the implement during operation to determine when a component may be experiencing an impaired operating condition. However, visually checking the implement components may be time consuming, and may be difficult to monitor remotely depending on field conditions. Further, the operator may not always hear when the sound or noise emitted by the operation of such components indicates a change in the operating condition of the components.

Accordingly, an improved system and method for detecting the operating condition of components of an implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for detecting the operating condition of components of an implement. The system includes an implement, a first sensor comprising one of an acoustic sensor or a vision-based sensor, a second sensor comprising the other of the acoustic sensor or the vision-based sensor, and a controller communicatively coupled to the first and second sensors. The controller is configured to receive performance data from the first sensor indicative of a performance of the implement. The controller is further configured to monitor the performance data received from the first sensor and identify an area of interest relative to the implement. Additionally, the controller is configured to control an operation of the second sensor to collect component data indicative of an operating condition of at least one component of the implement located within the area of interest.

In another aspect, the present subject matter is directed to a method for detecting the operating condition of components of an implement. The method includes receiving, with a computing device, performance data from a first sensor indicative of a performance of the implement. Further, the method includes identifying, with the computing device, an area of interest relative to the implement based at least in part on the performance data received from the first sensor. Additionally, the method includes controlling, with the computing device, an operation of a second sensor to collect component data indicative of an operating condition of at least one component located within the area of interest. The first sensor is one of an acoustic sensor or a vision-based sensor, and the second sensor is the other of the acoustic sensor or the vision-based sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
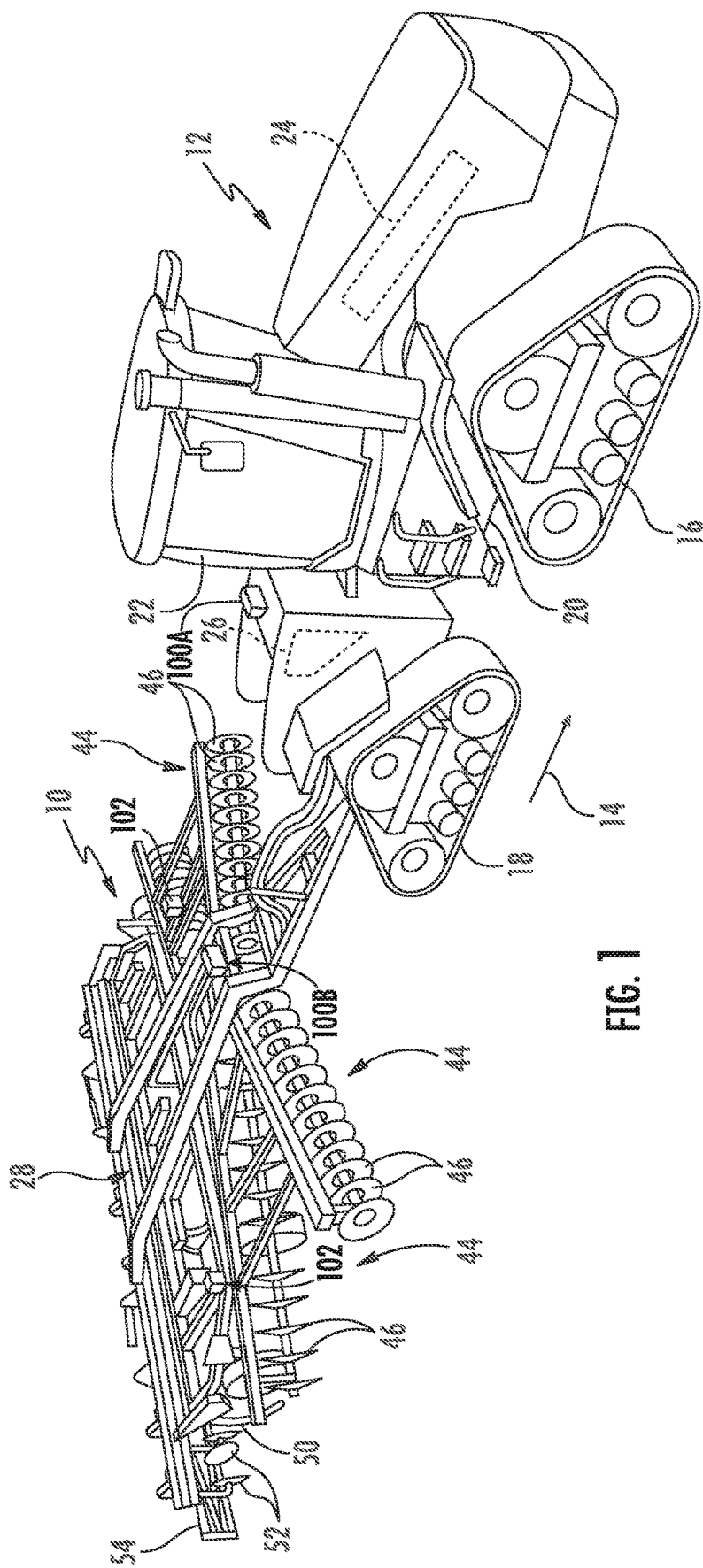
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the operating condition of components of an agricultural implement. In particular, the present subject matter is directed to systems and methods for determining whether components of an agricultural implement are experiencing an impaired operating condition in which a component may have, for example, significant wear, fractures, breaks, material accumulation, and/or the like. Specifically, in several embodiments, a controller of the disclosed system may be configured to receive performance data from an acoustic sensor or a vision-based sensor indicative of a performance of the implement as the implement performs an agricultural operation within a field. During normal operation, the performance data (i.e., acoustic data or image data) should correspond to expected performance data when components of the implement are not impaired (e.g., worn out, fractured, broken, plugged, etc.). However, when a component of an implement has an impaired operating condition, the performance data received from the acoustic sensor or the vision-based sensor will differ from the expected performance data. As such, a controller of the disclosed system may be configured to monitor the performance data received from the acoustic sensor or the vision-based sensor and identify an area of interest relative to the implement in which one or more impaired components may be located.

Thereafter, the controller may be configured to control the operation of the other of the acoustic sensor or the vision-based sensor to collect component data (i.e., acoustic data or image data) indicative of an operating condition of at least one component of the agricultural implement located within the area of interest. Based on the component data, the controller may be configured to determine whether the component(s) within the area of interest has an impaired operating condition. If it is determined that the component(s) does, in fact, have an impaired operating condition, the controller may perform one or more control actions. For example, the controller may be configured to indicate the impaired component(s) (e.g., via a user interface) to the operator and/or slow down or stop the implement.

Figure 2:
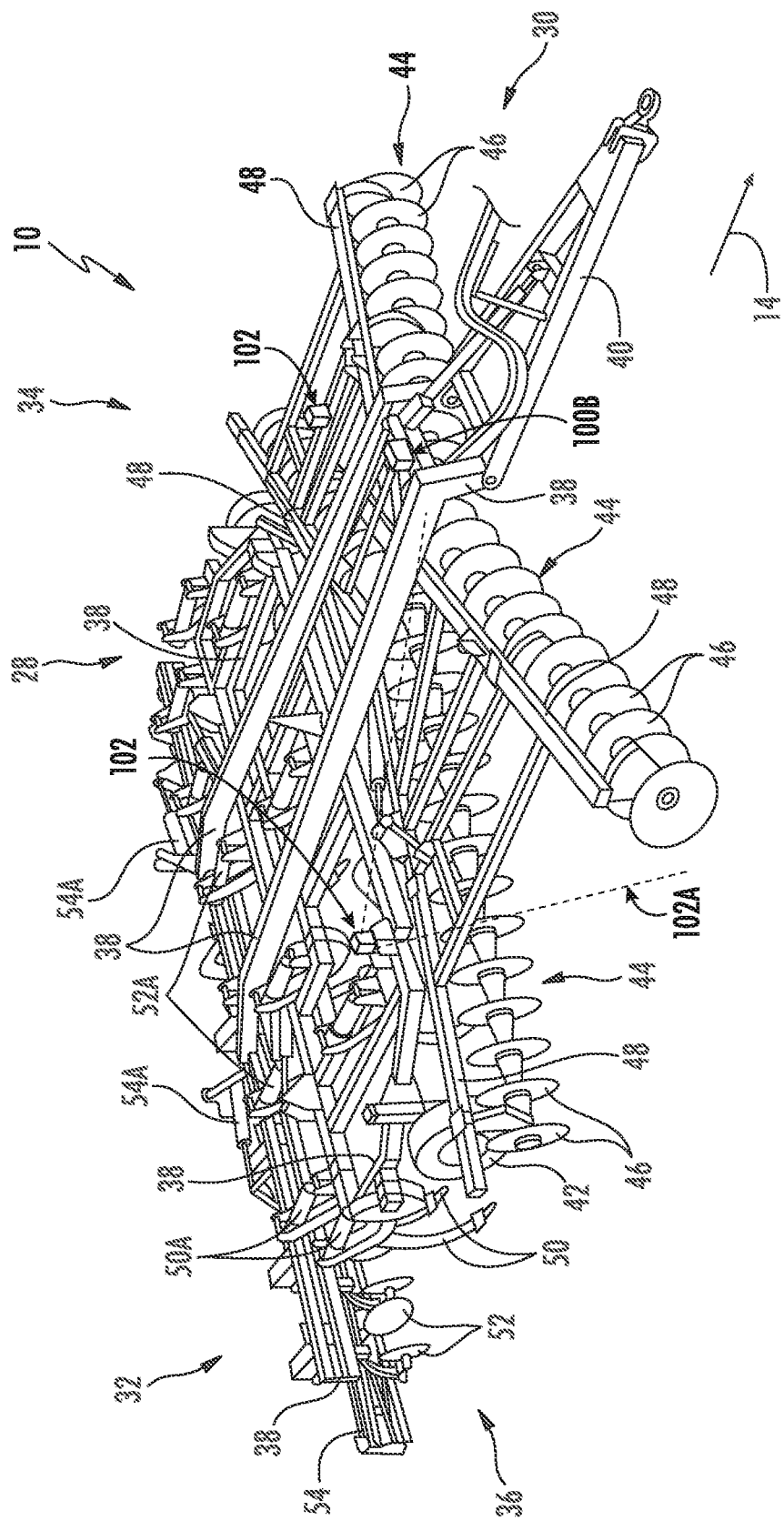
FIG. 2 illustrates an alternative perspective view of the agricultural implement shown in FIG. 1, particularly illustrating various components of the agricultural implement in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 106 shown in FIG. 3) for permitting an operator to control the operation of one or more components of the work vehicle 12 and/or one or more components of the implement 10. It should be appreciated that the user interface 106 may be positioned within the cab or may be positioned remotely from the work vehicle 12 and/or implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 or a plurality of tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. The implement 10 may further include shank frame actuator(s) 50A, leveling disk actuator(s) 52A, and/or basket assembly actuator(s) 54A configured to move or otherwise adjust the orientation or position of the shanks 50, leveling disks 52, and the basket assemblies 54, respectively, relative to the implement frame 28. It should be appreciated that, in other embodiments, any other suitable ground-engaging tools may be coupled to and supported by the implement frame 28, such as a plurality closing disks.

In accordance with aspects of the present subject matter, one or more sensors, such as one or more acoustic sensors 100 may be provided for detecting sounds generated by the implement 10 during an agricultural operation. For instance, as shown in FIG. 1, a first acoustic sensor 100A may be positioned at the aft end of the work vehicle 12 along the direction of travel 14. However, it should be appreciated that the acoustic sensor 100A may additionally or otherwise be supported on and/or coupled to any other suitable component of or location on the work vehicle 12 and/or on the implement 10. Moreover, it should be appreciated that one or more additional sensors may also be provided relative to the work vehicle 12 and/or the implement 10. For instance, as shown in FIGS. 1 and 2, a second acoustic sensor 100B may be positioned on the implement 10.

The acoustic sensor(s) 100 may, in one embodiment, be configured as any suitable directional microphone, such as a stereo directional microphone, an omnidirectional microphone, and/or the like. However, in alternative embodiments, the acoustic sensor(s) 100 may correspond to an acoustic accelerometer or any other suitable type of acoustic sensor. As such, the acoustic sensor(s) 100 may generate acoustic data indicative of acoustic parameters of the sound(s) generated by the implement 10 and/or the components of the implement 10. For instance, in one embodiment, the acoustic parameters may include an amplitude, frequency, pitch, and/or intensity of the sounds detected by the acoustic sensor(s) 100. However, it should be appreciated that, in alternative embodiments, the acoustic parameters may correspond to any other suitable parameters. Moreover, the acoustic data may include data corresponding to a direction of the sound(s) generated by the implement, which may be used to identify an area of the implement 10 and/or a specific component of the implement 10 which is generating the sound(s).

During normal operating conditions, each monitored component (e.g., ground engaging tools, bearings, support components, actuators, etc.) of the implement 10 may generate a known or expected sound(s). For instance, each monitored component may have one or more baseline or expected acoustic parameters, such as at least one of a baseline amplitude, a baseline frequency, a baseline pitch, or a baseline intensity during a normal operating condition. However, as will be described below in greater detail, when the sound(s) associated with a component(s) deviates from its baseline sound, the component(s) may have an impaired operating condition (e.g., in which the component(s) is worn out, fractured, broken, plugged, etc.), which typically affects the performance of the agricultural operation being performed by the implement 10.

In addition to the acoustic sensor(s) 100, one or more vision-based sensors 102 may be provided in operative association with the implement 10 and/or the vehicle 12. For example, vision-based sensor(s) 102 may be positioned on the implement 10, such as on one or more of the frame members 38 of the implement 10. Each vision-based sensor 102 is movable (e.g., rotatable, tiltable, a combination of rotatable and tiltable, and/or the like) by an actuator 104 (FIG. 3), and/or able to zoom in or out, such that a field of view 102A of the vision-based sensor 102 is directable towards different components of the implement 10 and/or a portion of the field behind the implement 10 along the direction of travel 14. As such, the vision-based sensor(s) 102 may be configured to capture data (e.g., image data) indicative of an operating condition of the component(s) and/or the performance of the implement 10.

For instance, the vision-based sensor(s) 102 may be configured as any suitable sensing devices configured to detect or capture image or image-like data indicative of an operating condition of the component(s) of the implement 10 and/or the performance of the implement 10. For instance, in several embodiments, the vision-based sensor(s) 102 may correspond to any suitable camera(s), such as single-spectrum camera or a multi-spectrum camera configured to capture images, for example, in the visible light range and/or infrared spectral range. Additionally, in a particular embodiment, the vision-based sensor(s) 102 may correspond to a single lens camera configured to capture two-dimensional images or a stereo camera(s) having two or more lenses with a separate image sensor for each lens to allow the camera(s) to capture stereographic or three-dimensional images. Alternatively, the vision-based sensor(s) 102 may correspond to any other suitable image capture device(s) and/or other vision sensor(s) capable of capturing "images" or other image-like data. For example, the vision-based sensor(s) 102 may correspond to or include radio detection and ranging (RADAR) sensors and/or light detection and ranging (LIDAR) sensors.

During normal operating conditions, each monitored component of the implement 10 may have a baseline or expected appearance. However, as will be described below in greater detail, when the appearance of a component(s) deviates from its baseline appearance (e.g., as depicted in images provided by the vision-based sensor(s) 102), the component(s) may have an impaired operating condition (e.g., in which the component(s) is worn out, fractured, broken, plugged, etc.), which typically affects the performance of the agricultural operation being performed by the implement 10. Similarly, during normal operating conditions, the field worked by the implement 10 may have a baseline or expected appearance. However, as will be described below in greater detail, when the appearance associated with at least a part of the worked field deviates from its baseline appearance, a portion of the implement 10 that is working such part of the field may have a component(s) experiencing an impaired operating condition.

As will be described in greater detail below, the combination of the acoustic sensor(s) 100 and the vision-based sensor(s) 102 may be used to identify an area(s) of interest relative to the implement 10 and determine when a component(s) of the implement 10 within such identified area(s) of interest is experiencing an impaired operating condition. Particularly, one of the sensor types 100, 102 may be used to identify an area(s) of interest relative to the implement 10 that might have impaired components, and the other of the sensor types 100, 102 may be used verify whether a component(s) located within the area(s) of interest has an impaired operating condition.

It should be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
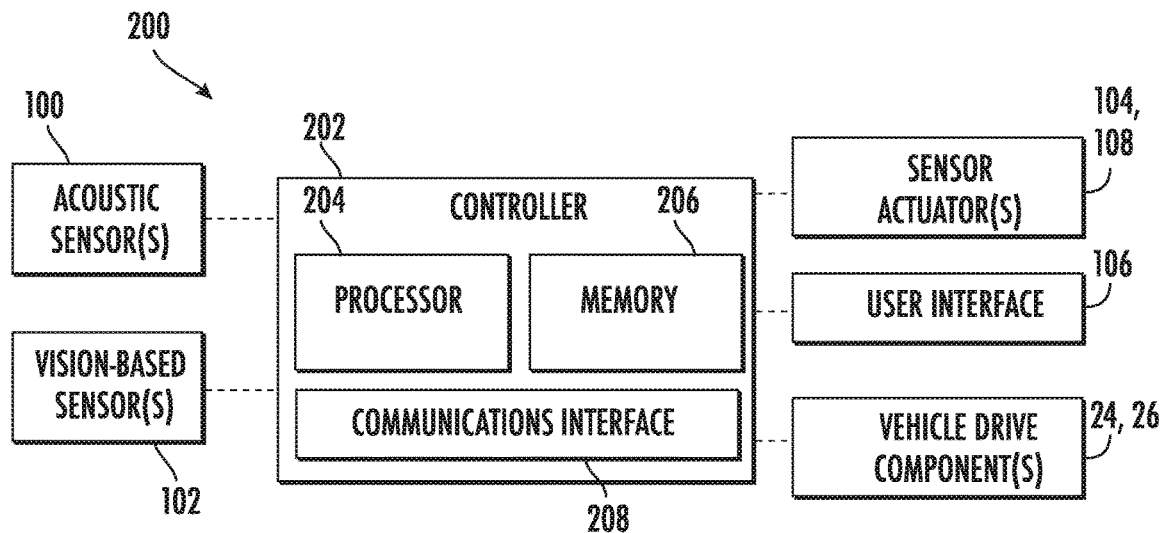
FIG. 3 illustrates a schematic view of one embodiment of a system for detecting the operating condition of components of an implement in accordance with aspects of the present subject matter.

Referring now to FIG. 3, a schematic view of one embodiment of a system 200 for detecting the operating condition of components an agricultural implement is illustrated in accordance with aspects of the present subject matter. In general, the system 200 will be described herein with reference to the implement 10 and the work vehicle 12 described above with reference to FIGS. 1 and 2. However, it should be appreciated by those of ordinary skill in the art that the disclosed system 200 may generally be utilized with agricultural implements having any other suitable implement configuration and/or with work vehicles 12 having any other suitable configuration.

As shown in FIG. 3, the system 200 may include a controller 202 configured to electronically control the operation of one or more components of the agricultural implement 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods that will be described herein. In addition, the controller 202 may also include various other suitable components, such as one or more input/output channels, a data/control bus and/or the like.

It should be appreciated that, in several embodiments, the controller 202 may correspond to an existing controller of the agricultural implement 10 and/or of the work vehicle 12 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 202 may be configured to include a communications module or interface 208 to allow for the controller 202 to communicate with any of the various other system components described herein. For instance, the controller 202 may, in several embodiments, be configured to receive data or sensor inputs from one or more sensors that are used to detect one or more parameters associated with the operating condition of the components of the implement 10. Particularly, the controller 202 may be in communication with one or more sensors configured to detect parameters indicative of an impaired operating condition of components of the agricultural implement 10. For instance, the controller 202 may be communicatively coupled to one or more acoustic sensor(s) 100 and one or more vision-based sensors 102 via any suitable connection, such as a wired or wireless connection, to allow data indicative of the operating condition of components of the implement 10 to be transmitted from the sensor(s) 100, 102 to the controller 202.

Specifically, referring back to FIGS. 1 and 2, one or more acoustic sensors 100 and one or more vision-based sensors 102 may be provided for capturing data indicative of a performance of the implement and/or of an operating condition of components of the implement 10. For instance, the acoustic sensor(s) 100 may be configured to generate data (e.g., acoustic data) indicative of a sound generated by the implement 10 and/or a particular component(s) of the implement 10. Similarly, the vision-based sensor(s) 102 may be provided for capturing data (e.g., image data) of the field behind the implement 10 and/or of component(s) of the implement 10. Additionally, the controller 202 may be configured to identify an area of interest relative to the implement 10 based at least in part on performance data received from the acoustic sensor(s) 100 or the vision-based sensor(s) 102, and control the other of the acoustic sensor(s) 100 or the vision-based sensor(s) 102 to collect component data indicative of the operating condition of at least one component located within the area of interest. Based at least in part on the component data associated with the component(s), the controller 102 may verify whether the component(s) has an impaired operating condition.

For instance, in some embodiments, the controller 202 may include one or more suitable algorithms stored within its memory 206 that, when executed by the processor 204, allow the controller 202 to identify an area of interest relative to the implement 10 based on the performance data received from the acoustic sensor(s) 100. For example, in one embodiment, the performance data comprises acoustic data from the acoustic sensor(s) 100 indicative of a performance of the agricultural implement 10. As indicated above, the acoustic data may include an acoustic parameter(s) (e.g., amplitude, frequency, pitch, and/or intensity) of sounds generated by the implement 10. In such an embodiment, the controller 202 may thus include one or more algorithms that compare the sounds produced by the implement 10 to a baseline sound to identify which sound(s) of the implement 10 is indicative of an impaired performance of the implement 10. More particularly, the controller 202 may identify the presence of an area of interest relative to the implement when the sound associated with the area of interest differs from the baseline sound. For example, the controller 202 may identify an area of interest (e.g., covering a group or area of component(s) of the implement 10) when the detected acoustic parameter(s) of the sound deriving from the area of interest crosses or differs from an acoustic parameter threshold(s) associated with the acoustic parameter(s). For instance, in one embodiment, the controller 202 may identify an area of interest relative to the implement 10 when the detected acoustic parameter(s) exceeds or falls below a baseline acoustic parameter threshold associated with the baseline sound expected to be produced during normal operation. Additionally, as indicated above, the acoustic data generated by the acoustic sensor(s) 100 may include directional data indicative of the location from which the detected sounds derive. Thus, the controller 202 may further be configured to identify the location of the area of interest relative to the acoustic sensor(s) 100 based on the directional data.

The baseline acoustic parameter threshold may be selected at least in part on one or more acoustic parameters associated with operation of the implement 10 and/or the work vehicle 12. For instance, the baseline acoustic parameter threshold may be selected to cancel out or ignore the frequencies and/or harmonics associated with one or more of the ground speed of the work vehicle 12, the rotational speed of the engine 24 of the work vehicle 12 (corresponding to the speed at which components of the implement 10 are driven), an operation of a hydraulic valve and/or pump associated with operation of the implement 10, movement of the hitch assembly 40 (e.g., detected using a vibration sensor), movement of the suspension system of the work vehicle 12, and or the operational positioning of the implement 12 (e.g., in a working position or a transport position). For example, the baseline acoustic parameter threshold may be selected to not overlap with frequencies or harmonics associated with shaking or rattling of the hitch, which could create a false positive in detecting a failure of the implement 10.

Similarly, the baseline acoustic parameter may be selected based at least in part on an intensity of the operation of the implement 10 and/or the work vehicle 12. For instance, the baseline acoustic parameter threshold may be selected based on the speed of the vehicle 12, the load on the engine 24, the load on one or more of the hydraulic pumps for operating the implement 10, or the operational position of the implement 10. For example, as a ground speed of the implement 10 changes, the acoustic parameter(s) of the sound(s) produced by the implement 10 may also change. As such, the controller 202 may be configured to receive an indication of the ground speed of the implement 10, e.g., from one or more speed sensors (not shown) and/or from an operator of the implement 10 via the user interface 106 and set the baseline acoustic parameter threshold according to the acoustic parameters expected to be generated by the implement 10 at that speed.

In some embodiments, the baseline acoustic parameter threshold may define a baseline acoustic parameter range bounded by an upper threshold and a lower threshold. During a normal operating condition, the sounds produced by the implement 10 should fall within the baseline acoustic parameter range. However, an area of the implement having a component(s) with a fracture, a break, or wear, is likely to generate a sound that exceeds the upper threshold. Similarly, an area of the implement having a component(s) with a plugged operating condition is likely to generate a sound that falls below the lower threshold. Thus, the controller 202 may identify an area of interest when the detected acoustic parameter(s) associated with the sounds deriving from the area of interest fall outside of the baseline acoustic parameter range. The baseline acoustic parameter may alternatively comprise either of the upper threshold or the lower threshold.

After identifying the area of interest relative to the implement 10, the controller 202 may be configured to control an operation of the vision-based sensor(s) 102 to collect component data indicative of an operating condition of the component(s) within the area of interest. For example, in one embodiment, the component data comprises image data from the vision-based sensor(s) 102. Accordingly, the controller 202 may, thus, include one or more suitable algorithms stored within its memory 206 that, when executed by the processor 204, allow the controller 202 to determine whether the component(s) within the area of interest identified has an impaired operating condition based at least in part on image data received from the vision-based sensor(s) 102.

It should be appreciated that, in some embodiments, the controller 202 may first be configured to control an operation of an actuator(s) 104 associated with the vision-based sensor(s) 102 to move the vision-based sensor(s) 102 such that the field of view 102A of the vision-based sensor(s) 102 is directed towards the component(s) located within the area of interest, assuming the field of view of the vision-based sensor(s) 102 is not already directed towards the component(s) within the area of interest.

In one embodiment, the controller 202 may be configured to automatically determine whether the component(s) within the area of interest has an impaired operating condition based on the image data received from the vision-based sensor(s) 102. For instance, in one embodiment, the controller 202 may be configured to perform one or more image processing techniques to analyze the image data to detect whether the component of interest has one or more features (e.g., fractures, chips, material accumulation, etc.) associated with an impaired operating condition(s). Additionally, or alternatively, in some embodiments, the communications interface 208 may allow the controller 202 to communicate with a user interface 106 of the vehicle 12 having a display device configured to display information. As such, the controller 202 may be configured to control the user interface 106 to display the image data to an operator and receive an input from the operator indicative of whether the component of interest has such features indicative of an impaired operating condition and/or a severity of such condition.

Alternatively, or additionally, in some embodiments, the controller 202 may include one or more suitable algorithms stored within its memory 206 that, when executed by the processor 204, allow the controller 202 to identify an area of interest relative to the implement 10 based on performance data received from the vision-based sensor(s) 102. For instance, in one embodiment, the performance data corresponds to image data received from the vision-based sensor(s) 102. As indicated above, in such embodiment, the field of view 102A of the vision-based sensor(s) 102 may be directed towards a worked area of the field rearward of the implement 10 relative to the direction of travel 14 such that the image data generated by the vision-based senor(s) is indicative of surface features (e.g., surface roughness, residue coverage, clod sizes, levelness, etc.) of the worked area of the field, which may in turn be indicative of the performance of the implement 10. The controller 202 may, thus, include one or more algorithms that compare the surface feature(s) of the worked area of the field to baseline surface feature(s) expected to be produced during normal operation of the implement 10 and identify an area of interest relative to the implement 10 when the surface feature(s) of the worked area of the field differ from the baseline surface feature(s).

For instance, the controller 202 may be configured to analyze the image data to automatically detect a worked area of the field that is indicative of an impaired performance of the implement 10. For example, the controller 202 may be configured to perform one or more image processing techniques on the image data to identify portions of the worked area of the field with a surface feature(s) that differs from the expected surface feature(s). Additionally, or alternatively, in some embodiments, the controller 202 may be configured to control the user interface 106 to display the image data to an operator of the agricultural implement 10 and receive an input from the operator via the user interface 106 indicative of a portion of a worked area of the field associated with the area of interest that has a surface feature(s) that differs from the expected surface feature(s). The area of interest relative to the implement 10 may then be identified based on the location of the portion of the worked area of the field relative to the implement 10. For instance, the area of interest may be identified as an area of the implement 10 having the tool(s) which work the portion of the worked area with the surface feature(s) that differs from the expected surface feature(s).

The controller 202 may subsequently be configured to control an operation of the acoustic sensor(s) 100 to collect component data indicative of the operating condition of the component(s) of the area interest. In some embodiments, the controller 202 may further be configured to control an operation of an actuator(s) 108 to move the acoustic sensor(s) 100 (e.g., rotate, tilt, slide, etc.) such that a field of detection of the acoustic sensor(s) 100 is directed towards the component(s) within the area of interest. The controller 202 may thus, include one or more suitable algorithms stored within its memory 206 that, when executed by the processor 204, allow the controller 202 to confirm whether the component(s) located within the area interest has an impaired operating condition based at least in part on acoustic data received from the acoustic sensor(s) 100. For instance, the controller 202 may be configured to compare the sound(s) generated by the component(s) located within the area interest to a baseline sounds(s), as described above, and determine that the component(s) of the area of interest has an impaired operating condition when the sound(s) generated by the component(s) differs from the baseline sound(s). For example, when the detected acoustic parameter(s) (e.g., amplitude, frequency, pitch, and/or intensity) of the sound generated by the component(s) exceeds or falls below the baseline acoustic parameter threshold associated with the expected baseline sound, the controller 202 may determine or confirm that the component(s) has an impaired operating condition. Additionally, or alternatively, when the baseline acoustic parameter threshold corresponds to a baseline acoustic parameter range, the controller 202 may determine or confirm that the component(s) located within the area of interest has an impaired operating condition when the detected acoustic parameter(s) of the sound generated by the component(s) falls outside of a baseline acoustic parameter range associated with the baseline sound expected to be produced by the component(s) during normal operation, as described above.

In some embodiments, the baseline acoustic parameter range may be selected at least in part based on a severity of the impaired condition of the component(s). For example, the baseline acoustic parameter range may include several acoustic parameter ranges corresponding to different severities of the component impairment. In one embodiment, the baseline acoustic parameter range may include a minor impairment range, which corresponds to the acoustic parameter(s) of a component when the component is experiencing a minor impairment condition (e.g., a small fracture, some wear, partial plugging, etc.). As such, when the detected acoustic parameter(s) falls outside of the minor impairment range, the associated component(s) of interest may be experiencing a minor impairment condition. Additionally, in some embodiments, the baseline acoustic parameter range may include a major impairment range, which corresponds to the acoustic parameter(s) of a component when the component is experiencing a major impairment condition (e.g., a large fracture, a break, heavy wear, full plugging, etc.). As such, when the detected acoustic parameter(s) falls outside of the major impairment range, the associated component(s) of interest is experiencing a major impairment condition.

Further, the baseline acoustic parameter ranges may have a proportional relationship. For instance, when the detected acoustic parameter falls outside of the minor impairment range and within the major impairment range, but is closer to the minor impairment range, the component may be experiencing an operating condition corresponding to a less severe impairment. Similarly, when the detected impairment parameter falls outside of the minor impairment range and within the major impairment range, but closer to the major impairment range, the component may be experiencing an operating condition corresponding to a more severe impairment.

In some embodiments, the controller 202 may further be configured to perform one or more control actions based on the determination of an impaired operating condition of component(s) of the implement 10. For instance, in some embodiments, the controller 202 may be configured to control the operation of the user interface 106, as described above, to indicate to an operator which component(s) has an impaired operating condition, and in some cases, the severity of the impaired operating condition. It should further be appreciated that the controller 202 may instead or additionally be communicatively coupled to any number of other indicators, such as lights, audio devices (e.g., alarms, speakers, etc.), and/or the like to provide an indicator to the operator regarding the condition of the component(s).

Additionally, or alternatively, in some embodiments, the controller 202 may be configured to perform one or more vehicle-related control actions based on the determination of impaired operating condition of the component(s) of the implement 10. For example, as shown in FIG. 3, in some embodiments, the controller 202 may be configured to control the operation of one or more vehicle drive components configured to drive the vehicle 12 coupled to the implement 10, such as the engine 24 and/or the transmission 26 of the vehicle 12. In such embodiments, the controller 202 may be configured to control the operation of the vehicle drive component(s) 24, 26 based on the determination of the impaired operating condition, for example, to slow down the vehicle 12 and implement 10 or bring the vehicle 12 and implement 10 to a stop.

It should be appreciated that, depending on the type of controller 202 being used, the above-described control actions may be executed directly by the controller 202 or indirectly via communications with a separate controller. For instance, when the controller 202 corresponds to an implement controller of the implement 10, the controller 202 may be configured to execute the implement-related control actions directly while being configured to execute the vehicle-related control actions by transmitting suitable instructions or requests to a vehicle-based controller of the vehicle 12 towing the implement 10 (e.g., using an ISObus communications protocol). Similarly, when the controller 202 corresponds to a vehicle controller of the vehicle towing the implement 10, the controller 202 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

It should be appreciated that while the system 200 has been described as being used to determine the operating condition (e.g., failure) of component(s) of the implement 10, the system 200 may similarly be used to determine the overall quality or performance of operation of the implement 10 within the field. For instance, the system 200 may be used to determine the whether the current operating parameters of the implement 10 allow the implement 10 to properly work the field. For example, the system 200 may monitor the sounds of the implement operations and then analyze image data of the field surface when the sounds fall outside of a given range to confirm whether the current implement operating parameters are acceptable. Conversely, the system 200 may monitor image data of the field surface and then analyze the sounds of the implement when the field surface has a different appearance than expected to confirm whether the current implement operating parameters are acceptable. If the current implement operating parameters are determined to not be acceptable, the system 200 may control the operation of the user interface 106, as described above, to notify the operator of the impaired performance of the implement, suggest one or more new settings of the implement 10, and/or suggest a new speed of the work vehicle 12. Alternatively, the system 200 may automatically adjust the operational settings of the implement 10 and/or control the operation of the vehicle drive component(s) of the vehicle 12, as described above, to change the speed of the work vehicle 12.

It should further be appreciated that while the system 200 has been described with reference to an agricultural implement being towed by a work vehicle, the system 200 may be used with any other suitable implement or vehicle configured for any other suitable applications. For instance, the system 200 may be used with an implement and/or vehicle suitable for construction, a transportation, sport, and/or the like.

Figure 4:
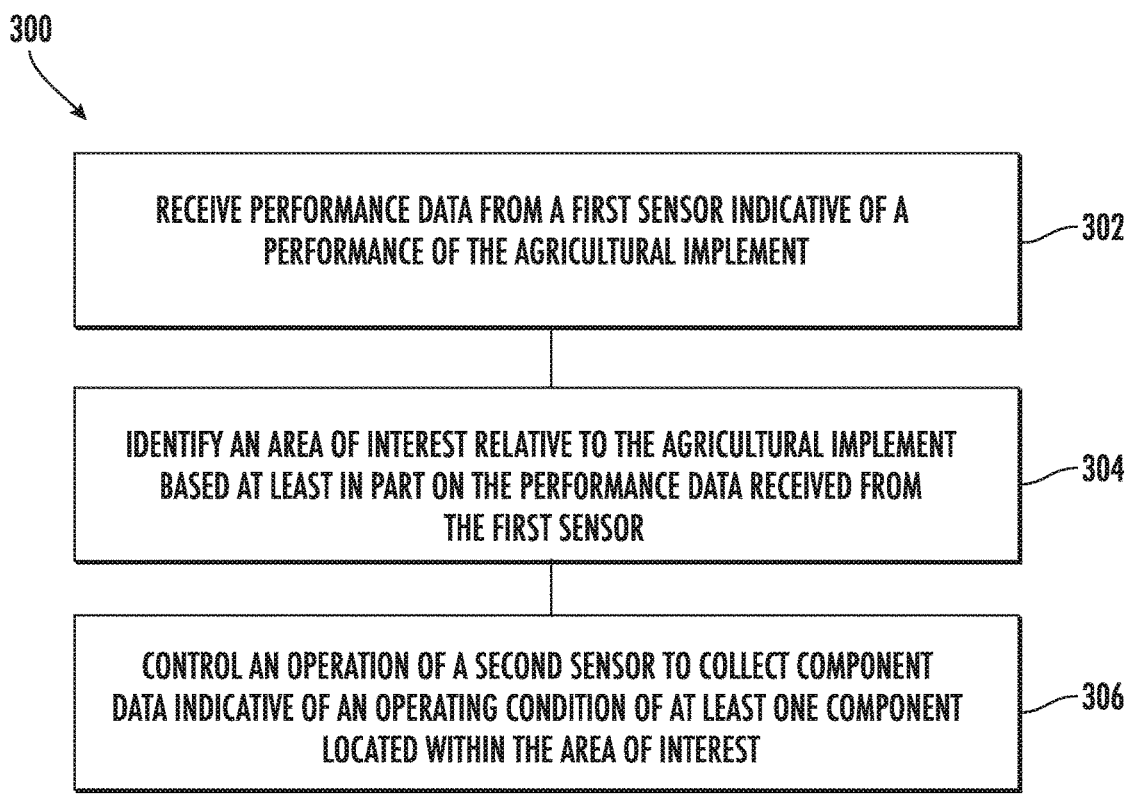
FIG. 4 illustrates a flow diagram of one embodiment of a method for detecting the operating condition of components of an implement in accordance with aspects of the present subject matter.

Referring now to FIG. 4, a flow diagram of one embodiment of a method 300 for detecting the operating condition of components of an agricultural implement is illustrated in accordance with aspects of the present subject matter. In general, the method 300 will be described herein with reference to the implement 10 and the work vehicle 12 shown in FIGS. 1 and 2, as well as the various system components shown in FIG. 3. However, it should be appreciated that the disclosed method 300 may be implemented with work vehicles and/or implements having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 4, at (302), the method 300 may include receiving performance data from a first sensor indicative of a performance of an agricultural implement. For instance, as described above, the controller 202 may be configured to receive performance data from one of an acoustic sensor 100 or a vision-based sensor 102 that is indicative of the performance of the agricultural implement 10.

Further, at (304), the method 300 may include identifying an area of interest relative to the agricultural implement based at least in part on the performance data received from the first sensor. For example, as indicated above, when the first sensor is an acoustic sensor 100, the performance data may correspond to acoustic data indicative of a sound deriving from an area of interest, where the area of interest may be identified when the sound deriving from the area of interest differs from a baseline sound. Alternatively, as indicated above, when the first sensor is a vision-based sensor 102, the performance data may correspond to image data of a worked area of a field, where the area of interest may be identified when the surface features of a portion of the worked area of the field associated with the area of interest differ from expected surface features.

Additionally, at (306), the method 300 may include controlling an operation of a second sensor to collect component data indicative of an operating condition of at least one component located within the area of interest. For instance, as indicated above, the second sensor may be other of the acoustic sensor 100 or the vision-based sensor 102. When the second sensor is an acoustic sensor, the controller 202 may control the acoustic sensor 100 to collect acoustic data of at least one component within the identified area of interest. Alternatively, when the second sensor is a vision-based sensor, the controller 202 may control the vision-based sensor 102 to collect image data of at least one component within the identified area of interest.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting the operating condition of components of an agricultural implement, the system comprising:
    an agricultural implement having a frame and a plurality of ground engaging tools supported by the frame, the plurality of ground engaging tools being configured to work a field during an agricultural operation;
    a first sensor comprising a vision-based sensor, the first sensor being supported on the agricultural implement or on a work vehicle towing the agricultural implement;
    a second sensor comprising an acoustic sensor; and
    a controller communicatively coupled to the first and second sensors, the controller being configured to:
        receive performance data from the first sensor indicative of a performance of the agricultural implement during the agricultural operation, the performance data comprising image data of the field worked by the agricultural implement;
        monitor the performance data received from the first sensor and identify an area of interest relative to the agricultural implement based at least in part on the image data of the field; and in response to identifying the area of interest, control an operation of the second sensor to collect component data indicative of an operating condition of at least one component of the agricultural implement located within the area of interest.

2. A system for detecting the operating condition of components of an agricultural implement, the system comprising:

an agricultural implement having a frame and a plurality of ground engaging tools supported by the frame, the plurality of ground engaging tools being configured to work a field during an agricultural operation, the plurality of ground engaging tools comprising at least one of disk blades, shanks, tines, leveling blades, or basket assemblies;

a first sensor comprising one of an acoustic sensor or a vision-based sensor, the first sensor being supported on the agricultural implement or on a work vehicle towing the agricultural implement;

a second sensor comprising the other of the acoustic sensor or the vision-based sensor; and a controller communicatively coupled to the first and second sensors, the controller being configured to:

receive performance data from the first sensor indicative of a performance of the agricultural implement during the agricultural operation;

monitor the performance data received from the first sensor and identify an area of interest relative to the agricultural implement, the area of interest including at least one of the plurality of ground engaging tools; and in response to identifying the area of interest, control an operation of the second sensor to collect component data indicative of an operating condition of at least one component of the agricultural implement located within the area of interest.

3. The system of claim 2, wherein, when the first sensor is the acoustic sensor, the performance data comprises acoustic data indicative of an acoustic parameter of a sound deriving from the area of interest, the controller being configured to compare the acoustic parameter to an acoustic parameter threshold and identify the area of interest when the acoustic parameter differs from the acoustic parameter threshold.

4. The system of claim 3, wherein the acoustic data generated by the acoustic sensor further comprises data indicative of a location of the area of interest relative to the acoustic sensor.

5. The system of claim 3, wherein, when the second sensor is the vision-based sensor, the component data comprises image data of the at least one component located within the area of interest, the controller being configured to receive the image data from the vision-based sensor and determine whether the at least one component has an impaired operating condition based on the image data.

6. The system of claim 2, wherein the controller is configured to control the operation of an actuator to move the second sensor such that a field of detection of the second sensor is directed towards the area of interest.

7. The system of claim 2, wherein the first sensor is the vision-based sensor, the performance data comprises image data of the field worked by the agricultural implement, the controller being configured to identify the area of interest based at least in part on the image data of the field.

8. The system of claim 1, wherein the controller is configured to analyze the image data to detect a worked area of the field that is indicative of an impaired operating condition of at least one component of the agricultural implement, the area of interest relative to the agricultural implement being identified based on the location of the worked area of the field relative to the agricultural implement.

9. The system of claim 1, wherein, when the second sensor is the acoustic sensor, the component data comprises acoustic data indicative of an acoustic parameter of a sound produced by the at least one component located within the area of interest, the controller being configured to receive the acoustic data from the acoustic sensor and determine that the at least one component has an impaired operating condition when the acoustic parameter differs from an acoustic parameter threshold.

10. A method for detecting the operating condition of components of an agricultural implement, the method comprising:

performing an agricultural operation within a field with ground-engaging tools supported on a frame of the agricultural implement, the plurality of ground engaging tools comprising at least one of disk blades, shanks, tines, leveling blades, or basket assemblies;

receiving, with a computing device, performance data from a first sensor indicative of a performance of the agricultural implement during the agricultural operation, the first sensor being supported on the agricultural implement or on a work vehicle towing the agricultural implement;

identifying, with the computing device, an area of interest relative to the agricultural implement based at least in part on the performance data received from the first sensor, the area of interest including at least one of the plurality of ground engaging tools; and in response to identifying the area of interest, controlling, with the computing device, an operation of a second sensor to collect component data indicative of an operating condition of at least one component located within the area of interest, wherein the first sensor comprises one of an acoustic sensor or a vision-based sensor, and the second sensor comprises the other of the acoustic sensor or the vision-based sensor.

11. The method of claim 10, wherein, when the first sensor is the acoustic sensor, the performance data comprises acoustic data indicative of an acoustic parameter of a sound deriving from the area of interest, the method further comprising comparing, with the computing device, the acoustic parameter to an acoustic parameter threshold, wherein identifying the area of interest comprises identifying the area of interest when the acoustic parameter differs from the acoustic parameter threshold.

12. The method of claim 11, wherein the acoustic data generated by the acoustic sensor further comprises data indicative of a location of the area of interest relative to the acoustic sensor.

13. The method of claim 11, wherein, when the second sensor is the vision-based sensor, the component data comprises image data of the at least one component located within the area of interest, the method further comprising receiving, with the computing device, the image data from the vision-based sensor and determining whether the at least one component has an impaired operating condition based on the image data.

14. The method of claim 10, further comprising controlling the operation of an actuator to move the second sensor such that a field of detection of the second sensor is directed towards the area of interest.

15. The method of claim 10, wherein, when the first sensor is the vision-based sensor, the performance data comprises image data of the field worked by the agricultural implement.

16. The method of claim 15, wherein identifying the area of interest comprises analyzing the image data to detect a worked area of the field that is indicative of an impaired operating condition of at least one component of the agricultural implement and identifying the area of interest based on the location of the worked area of the field relative to the agricultural implement.

17. The method of claim 15, wherein identifying the area of interest comprises controlling a user interface to display the image data and receiving a user input from an operator via the user interface identifying the area of interest.

18. The method of claim 15, wherein, when the second sensor is the acoustic sensor, the component data comprises acoustic data indicative of an acoustic parameter of a sound produced by the at least one component located within the area of interest, the method further comprising receiving, with the computing device, the acoustic data from the acoustic sensor and determining that the at least one component has an impaired operating condition when the acoustic parameter differs from an acoustic parameter threshold.

19. The method of claim 10, further comprising:
determining, with the computing device, that the at least one component located within the area of interest has an impaired operating condition based on the component data received from the second sensor; and
initiating, with the computing device, a control action in response to determining that the at least one component has the impaired operating condition.

20. The method of claim 19, wherein the control action comprises adjusting at least one of a ground speed of the agricultural implement or notifying an operator of the agricultural implement of the impaired operating condition of the at least one component.

21. The system of claim 1, wherein the area of interest includes at least one of the plurality of ground engaging tools,
wherein the plurality of ground engaging tools comprises at least one of disk blades, shanks, tines, leveling blades, or basket assemblies.

* * * * *